United States Patent [19]

Young

[11] Patent Number: 4,566,655

[45] Date of Patent: Jan. 28, 1986

[54] TWO-SPEED DRIVE FOR A FISHING REEL

[75] Inventor: John N. Young, Fairfax, Calif.

[73] Assignee: Charles C. Worth Corporation, Kentfield, Calif.

[21] Appl. No.: 670,022

[22] Filed: Nov. 9, 1984

[51] Int. Cl.⁴ .......................................... A01K 89/015
[52] U.S. Cl. ..................................... 242/215; 74/369; 74/756; 74/758; 74/759; 242/219; 254/344
[58] Field of Search ................. 242/215, 216; 74/756, 74/758, 751, 759, 753, 369; 254/344

[56] References Cited

U.S. PATENT DOCUMENTS 2,240,075  4/1941  Koralovsky et al. .............. 242/215
3,215,360 11/1965  Chambers ........................... 242/215
3,600,964  8/1971  Sarah .................................... 44/369

Primary Examiner—Billy S. Taylor
Attorney, Agent, or Firm—Melvin R. Stidham

[57] ABSTRACT

A two-speed drive for a fishing reel wherein a low friction clutch is interposed between the drive shaft and the high speed main drive gear. Planetary gears extend from one side of the main drive gear and are engaged by the secondary drive gear so that, in the event the low friction clutch slips, the main drive gear will be driven by the smaller secondary drive gear through orbital rotation of the planet gears.

7 Claims, 2 Drawing Figures

4,566,655

TWO-SPEED DRIVE FOR A FISHING REEL

BACKGROUND OF THE INVENTION

Fishing reels are designed to have high speed gear ratios for pulling lures quickly through the water. However, such high speed drive systems may have insufficient power available to pull in a fish when a strike is made. Therefore, it would be desirable to be able to shift to a lower speed, higher power drive to fight or retrieve the fish. On the other hand, should the fish turn and run toward the fisherman, it would be of great advantage to be able to shift rapidly back to high speed drive to retrieve the line rapidly and prevent it from slackening. Since the fisherman is holding the fishing rod with one hand and turning the reel with the other, it is essential that all gear shifting be, not only rapid, but fully automatic.

OBJECTS OF THE INVENTION

It is object of this invention to provide a two-speed drive for a fishing reel providing a high speed ratio at low loads and and a high mechanical advantage at high loads.

It is a further object of this invention to provide a two-speed drive for a fishing reel that will automatically shift into high speed mode when tension on the line is low.

It is a further object of this invention to provide a two-speed drive system for a fishing reel that will automatically shift into low speed, high mechanical advantage when line tension exceeds a predetermined setting.

Other objects and advantages of this invention will become apparent from the description to follow, particularly when read in conjunction with the accompanying drawing.

SUMMARY OF THE INVENTION

In carrying out this invention, there is provided a relatively large, main drive gear that rotates on the drive shaft and a smaller secondary drive gear that rotates with the drive shaft. A pinion that rotates the spool is driven directly by the main drive gear. Planet gears that extend from the side of the main drive gear engage the secondary drive gear as well as a ring gear that surrounds it. A low friction clutch is interposed between the main drive shaft and the main drive gear so that, at low loads the main and secondary drive gears rotate together to carry the ring gear with them through engagement of the planet gears. However, when the low friction clutch is overcome, the secondary drive gear rotates ahead of the main drive gear, turning the planet gears and causing them to turn the ring gear in the opposite direction. However, a ratchet device prevents such opposite rotation and, almost immediately, the ring gear becomes stationary, so that the planet gears orbit around it to carry the main drive gear and drive the output pinion at a lower gear ratio.

DESCRIPTION OF A PREFERRED EMBODIMENT

Figure 1:
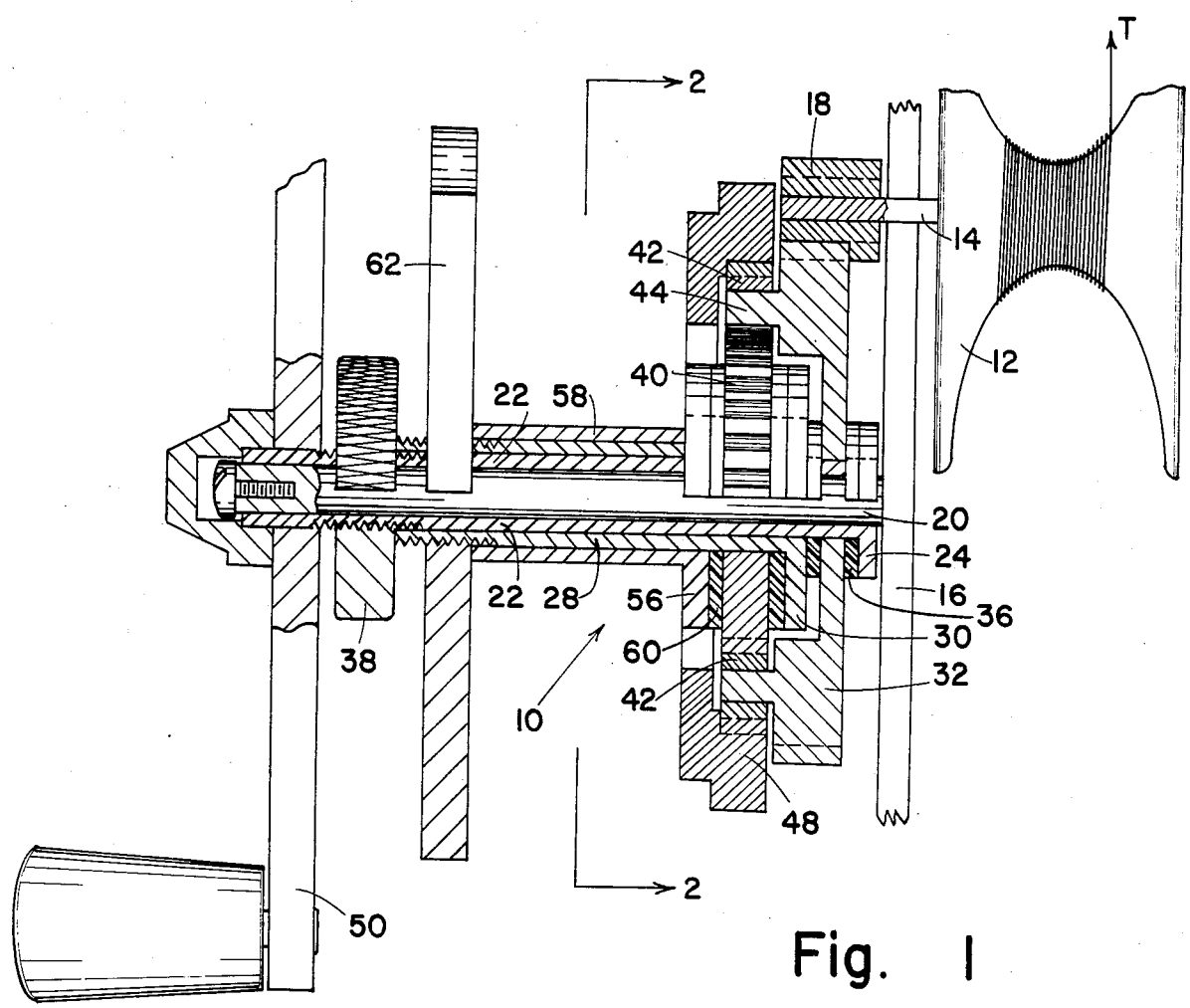
FIG. 1 is a vertical section view of the two-speed fishing reel drive of this invention.

Referring now to the drawing with greater particularity, the two-speed drive of this invention is adapted to drive a spool 12 which is carried on a shaft 14 rotatably mounted in a frame or housing 16, the shaft being driven by an output pinion 18. Fixed to the frame is a rod or spindle 20 on which is rotatably carried a first shaft 22 on the end of which is a radial collar 24. Keyed or splined to the first shaft 22, as by means of complementary flat surfaces 26 (FIG. 2) is a main drive shaft 28 on the end of which is a second radial collar 30.

Freely rotatable on the first shaft 22 and disposed between the first and second collars 24 and 30 is the main drive gear 32, the teeth of which 34 mesh with and drive the output pinion 18 at a relatively high speed ratio. A pair of annular friction pads 36 are carried on the opposing faces of the first and second collars 24 and 30 so that when the first and second collars are squeezed against the sides of the main drive gear 32, it is driven directly by the first and drive shafts 22 and 28. A small knurled knob 38 which is threaded onto the first shaft 22 and engages the end of the second or drive shaft 28 is turned to adjust the amount of friction force to drive the main drive gear 32 at low loads.

Rotatable with the main drive shaft is the secondary drive gear 40 that engages a series of planet gears 42 that are rotatably carried on stub shafts 44 protruding from the side of the main drive gear 32. The planet gears 42 also engage the teeth 46 of a ring gear 48, which as will be described, is mounted for uni-directional rotation on the outer housing of the reel 10.

The drive shaft 28 is driven by turning a handle 50 to rotate the first shaft 22 and, hence, the drive shaft 28 which is keyed thereto. This rotates the secondary drive gear 40 and, at low loads, also the main drive gear 32 through the medium of the low drag clutch formed by collars 24 and 30. Hence, at low loads the main drive gear 32, the secondary drive gear 40 and, through the planet gears 42, the ring gear 48 all rotate as a unit in the direction of the arrow A shown in FIG. 2. Hence, the output pinion 18 is driven directly by the main gear 32 on the drive shaft 28 at a relatively high speed ratio.

When tension T on the line increases above a certain level predetermined by setting of the knob 38, the low drag clutch 24,30 will slip so that the secondary drive gear 40 commences to outrun the main drive gear 32. This causes the individual planet gears 42 to rotate in the direction of the arrows B, tending to drive the ring gear 48 in the direction C. However, ratchet teeth 52 are provided around the outside of the ring gear 48 to be engaged by one of two or more pawls 54 to prevent such opposite direction rotation and cause the planet gears 42 to orbit around the inside of the ring gear 48, driven by the secondary drive gear 40.

Of course, as the planet gears orbit around the ring gear, they carry the main drive gear 32 with them, imparting rotation to the output pinion 18 at the lower speed ratio between the secondary drive gear 40 and the ring gear 48.

As above described, the secondary drive gear rotates with the drive shaft 28. Accordingly, on certain fishing reels, such as spinning reels, where the main drag control is located on some other shaft, the secondary drive gear 40 may be keyed or splined directly to the drive shaft 28. However, as here illustrated, the secondary drive gear is driven through the medium of a main drag clutch comprising the second collar 30 on the main drive shaft 28 and a third collar 56 on a sleeve 58 that is slidable on the main shaft 28. The sleeve 58 is keyed or splined to the drive shaft 28. Larger annular friction pads or discs 60 are carried on the facing sides of the second and third collars 30 and 56 and the pressure applied thereby is adjusted by a star wheel 62 that is threaded onto the main shaft 28 to engage the end of the sleeve 58. Because of the greater mechanical advantage afforded by the large star wheel 62 relative to the knurled knob 38, and because of the greater area of engagement between the friction pads on the main drag clutch 30, 56 than those on the low drag clutch 24, 30, the total friction force of the main drag control is much greater than that of the low speeds so that the secondary drive gear 40 will rotate with the drive shaft 28 until the main drag loads is exceeded. In addition, the materials of the rings may be selected to provide a greater coefficient of friction with the main drag clutch 30,56.

Figure 2:
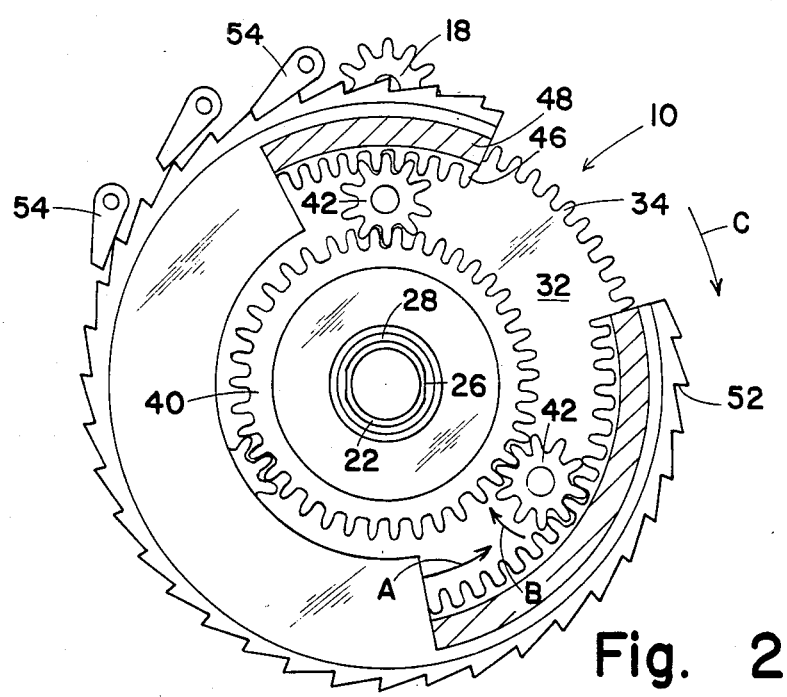
FIG. 2 is a vertical section view taken along line 2—2 of FIG. 1.

Referring now to FIG. 2 the pawls 54 which are carried on the frame to engage the ratchet teeth 52 around the ring gear 48 are disposed so that one pawl engages a tooth after the ring gear rotates through just one-third of the arcuate length of a ratchet tooth 52. That is, the pawls are spaced through arcs equal to a multiple of the arcuate length, of one tooth plus a fraction of that arcuate length depending on a number of pawls involved. Hence, with two pawls, one pawl would engage after revolution of one-half tooth, with three pawls one would engage after revolution of one-third tooth, etc. In this way, the down shift from high speed to low speed, high power drive is almost instantaneous.

By the same token, when tension T on the line decreases to the extent that the low drag clutch 24, 30 engages the main gear 32 will rotate, and immediately shift back to high speed drive.

While this invention has been described in conjunction with a preferred embodiment thereof, it is obvious that modification and changes therein may be made by those skilled in the art to which it pertains without departing from the spirit and scope of this invention, as defined by the claims appended hereto.

I claim:
1. A two-speed drive for a fishing reel comprising:
   a frame;
   a first shaft rotatable on said frame;
   a first clutch collar on said first shaft;
   a drive shaft slidable on said first shaft and keyed thereto to rotate therewith;
   a second clutch collar on said drive shaft;
   a main drive gear rotatable between said first and second clutch collars;
   high speed clutch adjustment means for moving said first and drive shafts axially relative to each other to squeeze said main drive gear between said first and second collars so that said first and second collars form a high speed, low drag clutch;
   a secondary drive gear driven by said drive shaft;
   at least one planetary gear rotatably carried on one side of said main drive gear and meshing with said secondary drive gear; and
   a ring gear surrounding and engaged by said planetary gear;
   said ring gear being rotatable on said frame;
   interengaging means on said ring gear and said frame enabling rotation of said ring gear in one direction only to rotate with said main drive gear when said high speed, low drag clutch is effective; and
   an output pinion driven by said main drive gear, directly from said drive shaft at high speed ratio when said high speed clutch is effective, and through said secondary drive gear at high power ratio when said high speed clutch is overcome.

2. The two-speed drive defined by claim 1 wherein said interengaging means include:
   ratchet teeth around said ring gear; and
   at least two pawls on said frame positioned so that one pawl will engage a ratchet tooth before said ring gear can rotate through the full arcuate length of a ratchet tooth.

3. The two-speed drive defined by claim 1 including:
   a first pair of annular friction pads mounted on said first and second collars to engage said main drive gear.

4. The two-speed drive defined by claim 1 including:
   a third shaft slidable on said second shaft;
   a third clutch collar on said third shaft;
   said secondary drive gear being positioned between said second and third clutch collars; and
   high drag clutch adjustment means for moving said second and third shafts axially relative to each other to squeeze said secondary drive gear between said second and third collars to form a high drag clutch;
   the friction force applied by said high drag clutch being greater than that applied by said high speed clutch.

5. The two-speed drive defined by claim 4 including:
   a second pair of annular friction pads mounted on said second and third collars to engage said secondary drive gear;
   the total friction force of said second pair of friction rings being greater than that of said second pair thereof.

6. A two-speed drive for a fishing reel comprising:
   a frame;
   a drive shaft rotatable on said frame;
   a main drive gear rotatable on said drive shaft;
   a secondary drive gear rotatable with said drive shaft;
   planetary gears rotatably carried on one side of said main drive gear and meshing with said secondary drive gear to be driven thereby;
   a rotatable ring gear surrounding and engaged by said planetary gear;
   an output pinion rotatable on said frame engaged by said main drive gear to be driven thereby;
   low-friction clutch means interposed between said drive shaft and said main drive gear so that said main drive gear is driven frictionally by rotation of said drive shaft in one direction to reel a line at low drag loads;
   said ring gear being rotated in said one direction by engagement therewith of said planet gears orbiting with said main and secondary drive gears; and
   ratchet means preventing rotation of said ring gear in the opposite direction so that when said low-friction clutch means is overcome, said main drive gear is driven by said secondary drive gear through orbital rotation of said planet gears.

7. The two-speed drive defined by claim 6 including:
   high drag load clutch means interposed between said drive shaft and said secondary drive gear.

* * * * *